3,476,736
SOLVENT REMOVAL FROM POLYOLEFIN IN VENTED EXTRUDER WITH WATER ADDITION
Le Roy C. Kahre, Bartlesville, Okla., assignor to Phillips Petroleum Company, a corporation of Delaware
Filed Apr. 14, 1966, Ser. No. 542,560
Int. Cl. C08f 1/88
U.S. Cl. 260—93.7      5 Claims

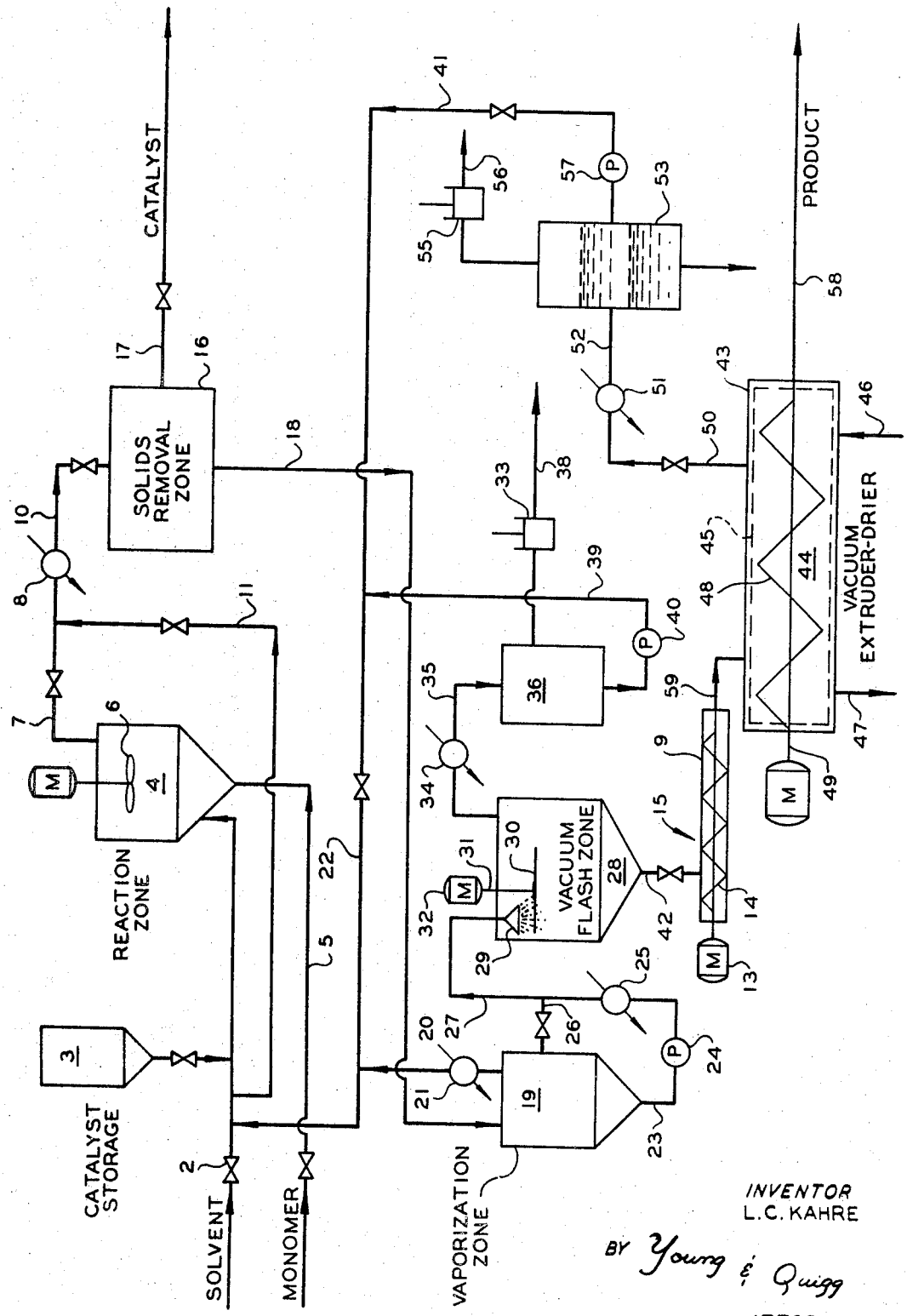

ABSTRACT OF THE DISCLOSURE

Residual solvent contained in a normally solid polymer is removed by treating the polymer containing residual solvent therein with water in an amount to form a non-ideal solution with the solvent and thereafter extruding the resulting mixture of water, solvent and polymer at a temperature above the softening point of the polymer.

---

This invention relates to the production and recovery of normally solid polymers. In one aspect, it relates to the discovery of a normally solid polymer from a solution thereof in a solvent. In another aspect, it relates to a novel method for the production of a substantially solvent-free polymer.

Several different processes are known in the art for the production of normally solid polymers, such as polyethylene, polypropylene, polybutadiene, and polystyrene. In many of the known processes, the polymer is initially obtained in the form of a solution in a solvent and must be recovered therefrom. Recovery can be effected by different methods. One much method is flash vaporization of the solvent which leaves the polymer as a non-volatile residue. According to another method, the solution is cooled to cause precipitation of the polymer which is subsequently recovered by filtration. Regardless of the polymer recovery method used, there is difficulty in removing the last traces of solvent from the polymer. This difficulty arises from the fact that as the solution becomes more and more concentrated, its viscosity increases. Heat transfer is correspondingly retarded and, if proper control is not exercised, the polymer may be thermally decomposed as a result of unduly high residence times in recovery equipment at high localized temperatures. It is highly desirable to free the polymer from the solvent insofar as possible because small amounts, e.g., a fraction of one weight percent, of solvent in the finished polymer form bubbles and, consequently, cavities when the polymer is heated preparatory to molding.

The present invention provides a process by which polymer can be recovered from solvent by vaporization of the solvent without thermal decomposition of the polymer and the finally recovered polymer contains less than one weight percent of solvent, and often less than 0.2 weight percent and can be molded without undue formation of cavities caused by solvent vaporization.

I have now discovered in accordance with this invention that addition of a volatilizing agent to a normally solid polymer prior to the treatment of same to remove remaining solvent still present therein after concentration to obtain a solid concentrate of polymer results in an increase in the volatility of the solvent and this permits easier removal of essentially all of the solvent from the polymer.

Although the exact mechanism of the invention is not certain, it is believed that the improvement of the present invention results from an increase of the activity coefficient of the polymer solvent by the addition thereto as a volatilizing agent a material which forms a non-ideal solution with the solvent. This increase in activity coefficient is significant since the higher temperatures normally employed in the removal of final solvent from the polymer results in a decrease in the activity coefficient of the solvent in the presence of molten polymer, thus rendering it more difficult to remove trace amounts of the solvent from the solid polymer.

Suitable materials which serve as volatilizing agents for the solvents normally employed in the polymerization of olefins include water, low-boiling alcohols having from 1 to 8 carbon atoms therein, such as methanol, ethanol, etc., liquid ammonia, liquid carbon dioxide, and other components which generally are relatively immiscible with the polymer solvent.

The overall process of the present invention is effected in three stages. The first stage is a vaporization step in which a solution of normally solid polymer, ordinarily relatively dilute, is subjected to an elevated temperature, above the melting point of the polymer, and a substantial portion of the solvent is thereby vaporized. In the second stage, the concentrated solution obtained as a residue in the first stage is subjected to varporization conditions below the melting point of the polymer to remove most of the remaining unvaporized solvent and obtain a solid polymer concentrate. In the third stage, the solid polymer concentrate containing a small amount of residual solvent from the second stage is mixed with a small amount of a volatilizing agent that forms a non-ideal solution with said residual solvent and the resulting blend passed to a vented extruder or other device wherein the polymer is heated to a temperature above its softening point and the molten polymer kneaded. Most of the residual solvent as well as the volatilizing agent are vaporized and vented from the polymer. The polymer thus freed of solvent is solidified and recovered as a product.

The melting point of the polymer will vary, depending on the physical and chemical nature and origin of the polymer. Polyethylenes ordinarily range in melting point from about 210 to about 260° F. The polyethylenes prepared by the process of Hogan and Banks ordinarily have melting points in the range 240 to 260° F. but can have melting points outside this range.

The second step is concluded at a temperature below the melting point of the polymer, and preferably at a subatmospheric pressure. Thus, an apparently "dry" or solid flash residue is obtained which is much more readily removed from the flashing apparatus than is a molten or liquid residue. It is also within the scope of this invention to form and collect the residue in the "dry" state and melt the collected residue for transfer, as a liquid, to a subsequent step in the process.

The recovery process of this invention is particularly applicable to the recovery of a polymer produced in a process of the type disclosed in U.S. Patent 2,825,721 to Hogan and Banks wherein an aliphatic 1-olefin having a maximum chain length of eight carbon atoms and no branching nearer the double bond than the 4-position is subjected to polymerization conditions in the presence of a catalyst comprising chromium oxide, of which a substantial portion of the chromium is hexavalent, associated with at least one oxide selected from the group consisting of silica, alumina, zirconia, and thoria. The chromium (Cr) content of the catalyst is ordinarily a minor proportion, preferably from 0.1 to 10 weight percent. Polymerization is ordinarily conducted at a temperature in the range 150 to 450° F. The reacted olefin, e.g., ethylene and/or propylene, is often, though not necessarily, subjected to the polymerization conditions in admixture with a hydrocarbon solvent which is inert and can exist as a liquid at the polymerization temperature. Suitable solvents of this class are normally liquid naphthenes, such as cyclopentane, cyclohexane, methylcyclopentane, methylcyclohexane, and paraffinic hydrocarbons having from 3 to 12, preferably 3 to 8, carbon atoms per molecule, e.g., butanes, pentanes, hexanes, isoheptanes, normal octane and 2,2,4-trimethylpentane. The reaction can be conducted as a fixed-bed reaction but is, in many cases, conducted with the catalyst in comminuted form in suspension, as a slurry, in the hydrocarbon solvent. The effluent withdrawn from the reactor comprises a solution of polymer in the solvent, and when a slurry or suspended catalyst is used, the effluent comprises a solution of the polymer in the solvent, suspended catalyst with undissolved polymer adhering thereto, and in many cases, small amounts of unreacted olefin. The unreacted olefin can be removed by venting and/or flashing and the remaining mixture is ordinarily heated to a suitable temperature to effect substantially complete solution of the polymer in the solvent. Additional solvent can be added at this point, if desired, and it is ordinarily the practice to adjust the concentration of polymer in the solution to a value in the range of approximately two to approximately 10 weight percent. The solution is then filtered or centrifuged to remove the suspended catalyst and a solution containing from two to 10 weight percent of polymer in the solvent is thus obtained from which the polymer is recovered. The method of this invention is particularly applicable to the recovery of polymer from such a solution, and particularly to such a solution of a polyethylene. Polymers so recovered are useful for fabrication into pipe, tubing, electrical insulation, and water-resistant wrappings, as more fully set forth in the cited application.

According to one modification of this process, approximately 25 to 75 percent of the solvent is vaporized in the first stage, from about 85 to 99 percent of the remaining solvent is vaporized in the second stage, and most or substantially all of the remaining solvent is vaporized in the final stage.

When the process is applied to a solution of polyethylene in, for example, cyclohexane, as previously indicated, it is preferred that the solution fed to the first step of the process have a polyethylene concentration in the range two to 10 weight percent. The first step concentrates this solution to a polyethylene concentration in the range eight to 15 weight percent. The second stage effects a further concentration to from 50 to 99 percent, and the final stage decreases the solvent concentration to less than one weight percent in the product polymer.

The first step in the recovery process is an evaporation conducted at temperatures in the range 250 to 350° F. and above the melting point of the polymer and the normal boiling point of the solvent, and a pressure in the range 0 to 100 p.s.i.g.; the second step is a vacuum flash conducted at a temperature in the range 100 to 250° F., and below the melting point of the polyethylene, at a pressure which is preferably not greater than 20 p.s.i.a. but which can be as high as about 30 p.s.i.a.; the final step is a vacuum extrusion step conducted at a maximum pressure of about 10 p.s.i.a. and a temperature in the range 375 to 450° F. In the final step, the molten polyethylene is subjected to mixing or kneading after adding a volatilizing agent that is relatively immiscible with the solvent and vaporizing said solvent and volatilizing agent under vacuum. The molten polymer is then extruded in the form of a continuous column or filament and can be cut into pellets or cylindrical or other desired shape and any desired length.

The first two stages of the process of this invention can be conducted in evaporators or vacuum flash tanks, the general construction of which is well known in the art. However, certain special features are involved in the construction of the second flash apparatus. It has been found that it is difficult to comminute a concentrated solution of polyethylene to form droplets by passing same through an ordinary spray apparatus. In many cases, the solution passes through the openings of the spray in the form of strings or filaments. This condition can be remedied by the use of any suitable mechanical means for severing the extruded strings or filaments. One type of apparatus for this purpose is subsequently described herein.

The apparatus used in the final step is ordinarily in the form of a heated elongated chamber having apparatus connected therewith which can reduce the pressure therein to sub-atmospheric. This apparatus is also provided with an agitation or kneading device, such as one or more screw conveyors and is further equipped with one or more outlet conduits in the form of a constricted opening or die through which the molten polymer can be extruded.

The solvent vaporized in the three steps according to this invention can be condensed, combined, and recovered, for example, for recycling to the polymerization reaction.

The accompanying drawing is a diagrammatic illustration of one embodiment of the invention in connection with a polyethylene production process of the type described in the cited patent of Hogan and Banks.

In the system shown in the drawing, solvent enters through inlet 2 and is mixed with catalyst supplied from storage zone 3. The catalyst can be, for example, a chromium oxide-silica catalyst containing 1.9 weight percent chromium trioxide and prepared as described subsequently herein. The catalyst particle size is sufficiently small to facilitate the formation of a slurry or catalyst in the solvent. A suitable range of particle size is from 20 to 100 mesh. The catalyst-solvent slurry passes into reaction zone 4. Ethylene and butene-1 if used enters the system through inlet 5 and passes into the reaction zone 4 wherein it is mixed with the catalyst and the solvent at a temperature, for example, of approximately 275° F. The solvent can be cyclohexane. The proportions of solvent and ethylene are so adjusted that the concentration of polymer in the reaction mixture does not exceed approximately 15 percent and preferably is in the range from five to 10 weight percent. The pressure in the reaction zone 4 is sufficient to maintain the solvent substantially in the liquid phase and can be, for example, 500 p.s.i. The reaction mixture is maintained in a state of turbulence so that the catalyst is maintained in a substantially uniform suspension or slurry in the reaction mixture. The turbulence can be obtained by jet action of incoming ethylene through inlet 5 and/or by the use of a mechanical stirrer indicated by the numeral 6 and driven by a suitable motor M. The reaction zone effluent which comprises a mixture of polymer, solvent, and suspended catalyst, together with small amounts of unreacted and/or inert gas, is passed through conduit 7 and heater 8 to conduit 10 to solids removal zone 16. The material passed through conduit 10 is a homogeneous solution of substantially all of the polymer in the cyclohexane solvent, which solution contains suspended solid catalyst. Solids removal zone 16 comprises any suitable equipment or combination thereof known in the art for the removal of suspended solids from liquids. For example, it can be a filter or centrifuge. It should be suitable for operation under pressure in order to maintain the solvent in the liquid phase during the separation. Catalyst removed by the centrifuge is withdrawn from the system through conduit 17. The withdrawn catalyst can be regenerated or reactivated, if desired, and recycled to catalyst storage zone 3 by means not shown in the drawing. The solution which has been freed of suspended solids is passed through conduit 18 to evaporation zone 19 which is ordinarily in the form of a flash evaporation tank and is operated, for example, at a temperature of 290° F. and a pressure of 33 p.s.i.g. Approximately half of the solvent is evaporated in zone 19, and the evaporated solvent is passed through conduit 20 and condenser 21. The condensed solvent is then returned through conduits 22 and 2. The residue from evaporation zone 19 is passed through conduit 23, pump 24 and heat exchanger 25 wherein the temperature is raised, for example, to 310° F. Part of the solution is returned through conduit 26 to evaporation zone 19. This mode of operation allows outside heating of the unvaporized material from evaporation zone 19 and is a preferred method of supplying heat to said zone, since it is ordinarily impractical to supply heat efficiently directly to the interior of zone 19.

The remainder of the unvaporized material is then passed through conduit 27 to flash zone 28, which is operated, for example, at a temperature of 135° F. and 13 p.s.i.a. The solution entering flash zone 28 has a concentration, for example, of 10 weight percent polyethylene in the cyclohexane solution. The partially concentrated polymer solution enters flash zone 28 through spray means 29 which is of conventional construction. Since a polymer of the type here involved is not readily atomized in the form of liquid droplets, the polymer solution emerges from spray means 29 in the form of continuous strings or filaments. In order to facilitate movement of the polymer through the system and in order to promote vaporization of the solvent, there is provided a cutting means designated by the numeral 30 which comprises a plurality of knife blades mounted on a rotatable shaft 31 which is driven by suitable motor 32. A vacuum may be maintained on flash zone 28 by means of a vacuum pump 33 which is connected to zone 28 through condenser 34, conduit 35, accumulator 36, and conduit 37 or the flash zone may be operated under slight pressure. Solvent which is vaporized in flash zone 30 is condensed in condenser 34 and passed through conduit 35 to accumulator 36. Gaseous material is withdrawn from the system exhaust 38. Condensed solvent is passed through conduit 39 by means of a pump 40 and then passes through conduits 41 and 22 for return to conduit 2.

Unvaporized material from vacuum flash zone 28 passes through conduit 42 to mixer 9 wherein a volatilizing agent that form a non-ideal mixture with cyclohexane, such as water, is added to the solid polymer prior to its introduction to vacuum extruder-dryer 43. While the mixer 9 is illustrated with conveying screw 14 actuated by motor 13, any batch or continuous system can be employed at this point in the process so as to mix water or any other liquid introduced through conduit 15 with the solid polymer and remaining solvent therewith. After mixing, the resulting composition is passed through conduit 59 to vacuum extruder-dryer 43. The vacuum extruder-dryer comprises an inner chamber 44 enclosed within a heating jacket 45 through which hot oil is circulated, being supplied through inlet 46 and withdrawn through inlet 47 to heating and recirculation means, not shown. Within chamber 44, is positioned one or more helical conveyors or extruders 48 mounted on a shaft 49 which is connected with a suitable driving motor, as shown in the drawing. Also connected with the inner chamber 44 of the vacuum extruder-dryer through conduit 50, condenser 51, conduit 52, accumulator 53, and conduit 54, is vacuum pump 55 which exhausts through conduit 56.

Concentrated polymer at a temperature below its melting point, and containing approximately 2 weight percent of cyclohexane solvent, is withdrawn from flash zone 28 through conduit 42 and passed to mixer 9, water added in an amount about equal to the cyclohexane, and then passed to vacuum extruder-dryer 43 and is therein kneaded at a temperature above its melting point, under a vacuum produced by vacuum pump 55, so that substantially the last trace of solvent and the water are removed therefrom. Solvent and water vaporized in vacuum extruder-dryer 43 are passed through conduit 50, condensed in condenser 51 and passed into separator 53. Water is withdrawn from the bottom and recycled to mixer 9. Solvent is withdrawn from the middle and returned through pump 57 and conduits 41 and 22 to inlet 2.

Molten polymer is therefore extruded as one or more strands or filaments from vacuum extruder-dryer 43 as product 58 and recovered and stored or utilized by any manner conventional to the art.

Although not shown in the drawing, the first or evaporation step (zone 19) can be effected in two stages, the first being effected in an apparatus of the type described in connection with zone 19 and the second being a similar apparatus operated at a slightly lower temperature and pressure within the ranges disclosed in connection with the discussion of zone 19. Thus, in the first stage of step 1, a 2 to 4 weight percent polymer solution can be flashed at from 300 to 350° F. and 50 to 100 p.s.i.g. to obtain a concentrate containing from 5 to 7 weight percent polymer, which is flashed in the second stage of step 1 at from 250 to 300° F. and from 0 to 50 p.s.i.g. to obtain a concentrate containing from 9 to 12 weight percent polymer as feed to step 2, the vacuum flash step.

When the reactor 4 is a high solids reactor such as is known in the art, reactor effluent having a high concentration of polymer therein can be passed directly to conduit 23 of the above-described figure, eliminating solid removal zone 16 and evaporation zone 19 as well as conduit 26.

Polymers may also be formed in the solid state in the reactor. Thus, a slurry of solid polyethylene may be produced in isobutane diluent with the reactor 4. The slurry is then passed directly from the reactor to line 23 for solvent removal and polymer recovery.

The following example will further illustrate the invention but is not intended to be limiting thereto.

EXAMPLE I

In the production of polyethylene, a saturated solution of ethylene in cyclohexane is maintained in a pressure reactor equipped with a stirrer. The cyclohexane containing 20 to 100 mesh catalyst in suspension is supplied continuously to the reactor. Ethylene and butene-1 if used, from which oxygen has been removed by contact with reduced copper oxide, is supplied to the reactor as a separate stream. The catalyst is prepared by impregnating a steam-aged, coprecipitated gel composite comprising 90 weight percent silica and 10 weight percent alumina with an aqueous solution of chromium trioxide, drying the resulting solid composite, and heating the dried composite at approximately 1300° F. for about five hours in a stream of substantially anhydrous air. The catalyst contains a total of 1.9 weight percent chromium trioxide.

The reactor is maintained at a temperature of approximately 300° F. and a pressure of approximately 600 p.s.i.g. Total effluent is continuously withdrawn from the reactor, heated to 315° F., and passed to a solids removal zone wherein the catalyst is removed by centrifugation at approximately 315° F. and 100 p.s.i. The resulting five percent solution of polyethylene is passed to a solvent evaporator maintained at 290° F. and 33 p.s.i.g., wherein approximately half of the solvent is vaporized. The unvaporized material is withdrawn from the body of the evaporator and passed through a heater wherein it is heated to approximately 310° F. Approximately half of the heated material is returned to the evaporator to supply heat thereto. The remainder is passed to a flash tank maintained at 135° F. and 13 p.s.i.g. The entering solution, which contains approximately 10 weight percent polyethylene, is passed through a spray nozzle adjacent to which is a revolving knife blade which comminutes the filament-like material which emerges from the spray nozzle. A concentrate containing approximately 98 weight percent polyethylene and in the form of small solid particles is removed from the bottom of the vacuum flash tank and is passed to a mixer such as an auger conveyor wherein 2 percent by weight water is added thereto. The resulting polymer-water-solvent mixture is passed to a vacuum extruder-dryer Model 2052B, manufactured by Welding Engineers, Inc., and containing a double helical agitator. In the vacuum extruder-dryer, the temperature is maintained between 370 and 450° F. by circulating hot oil through the heating jacket. The pressure within the middle chamber of the extruder-dryer is maintained at approximately 30 to 50 mm. Hg. Molten polymer containing from 0.019 to 0.026 weight percent of solvent is extruded as filaments from the vacuum extruder-dryer and the filaments passed through an open tank containing water which cools and solidifies the polymer. The solidified polymer emerges from the cooling tank and is cut by means of a rotary cutter into cylindrical pellets which are recovered as the product of the process. Water and solvent are removed as vapors from the vent section of the extruder, condensed, separated and recycled.

Although the process of this invention has been described in connection with a particular polyethylene process, it is clearly not limited thereto but is applicable to the recovery of any normally solid thermoplastic polymer from a solution thereof in a solvent. Thus, the process is also applicable to solutions of polybutadienes, especially hydrogenated polybutadienes as described in Patent No. 2,864,809, by Jones and Moberly, polystyrenes, polypropylenes, polyisobutylenes, and polyethylenes produced by processes other than that of the type described herein, as well as to the recovery of halogenated polyethylenes. Also, the process is not limited to the recovery of polymers from saturated hydrocarbon solvents but is applicable where solvents such as chloroform, carbon tetrachloride, carbon disulfide, and aromatic hydrocarbons and derivatives thereof are used as solvents. When practicing the present invention with polymers of 1-olefins the polymer is generally heated to a molten state, i.e., above the melt point of the poly 1-olefin. When applied to polymer of diolefins, the temperature employed is generally that sufficient to render the polymer soft so that it can be worked in the blender. The essence of this invention is that a normally solid thermoplastic can be recovered, substantially free from residual solvent by a process which comprises adding a volatilizing agent that forms a non-ideal solution with said residual solvent to said polymer containing residual solvent and agitating the resulting polymer blend at a temperature above its melting point to vaporize a substantial proportion of the remaining solvent and added volatilizing agent and recovering a substantially solvent-free polymer. Variation and modification are possible within the scope of the disclosure and the claims. Thus, the solid concentrate can be transferred from the vacuum flash zone to the vacuum extruder-dryer in the molten state by use of a conventional solids conveyor, or manually.

Reasonable variations and modifications can be made or followed, in view of the foregoing, without departing from the spirit and scope of this invention.

I claim:

1. A process for the removal of residual solvent from a normally solid thermoplastic polymer which is initially free of water prior to extrusion, which comprises mixing with said normally solid, water-free, thermoplastic polymer containing residual solvent therein, water in an amount sufficient to form a non-ideal solution with said solvent and thereafter extruding the resulting polymer-residual solvent-water mixture at a temperature above the softening point of the polymer so as to vaporize the solvent-water mixture and thereafter recovering the substantially solvent-free polymer.

2. In a process for the recovery of a normally solid thermoplastic polymer from a solution thereof in a solvent wherein said solution is first concentrated by being subjected to an elevated temperature above the melting point of the polymer and sufficient to remove a substantial portion of solvent thereby forming a concentrated solution of said polymer and solvent which is thereafter subjected to a further concentration at a temperature below the melting point of the polymer but sufficient to remove most of the remaining unvaporized solvent thereby producing a solid polymer concentrate containing a small amount of residual solvent therein and in which said solid polymer concentrate containing a small amount of residual solvent is thereafter extruded at a temperature above the softening point of the polymer, the improvement which comprises treating said solid polymer concentrate containing said small amount of residual solvent with water in an amount sufficient to form a non-ideal solution of said water and solvent prior to the extrusion of said solid polymer concentrate.

3. A process according to claim 2 wherein said polymer is a polymer of a 1-olefin having from 2 to 8 carbon atoms therein.

4. A process according to claim 2 wherein said polymer is a polymer of ethylene and said solvent is cyclohexane.

5. A process according to claim 2 wherein said solid polymer is a polymer of a diolefin having 4 to 8 carbon atoms.

References Cited

UNITED STATES PATENTS

| | | | |
|---|---|---|---|
| 2,957,855 | 10/1960 | McLeod | 260—88.2 |
| 3,072,626 | 1/1963 | Cines | 260—93.5 |
| 3,287,301 | 11/1966 | Fysh et al. | 260—23.7 |

JOSEPH L. SCHOFER, Primary Examiner

W. F. HAMROCK, Assistant Examiner

U.S. Cl. X.R.

260—88.2, 94.7, 94.9, 96